Jan. 3, 1928.
A. J. SMITH
PIPE COUPLING
Filed July 9, 1926
1,655,382
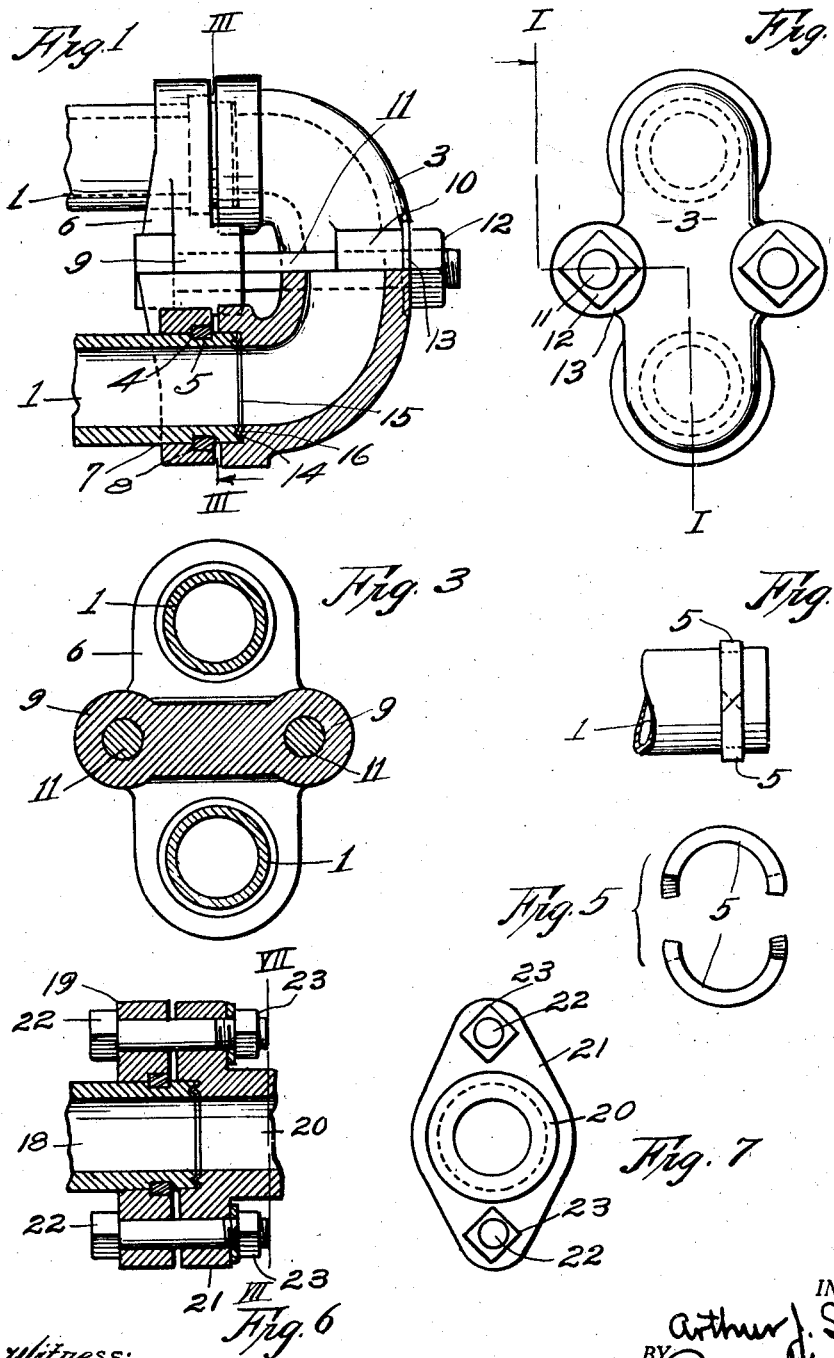

Patented Jan. 3, 1928.

1,655,382

UNITED STATES PATENT OFFICE.

ARTHUR J. SMITH, OF INDEPENDENCE, MISSOURI, ASSIGNOR TO SMITH ENGINEERING CO., OF KANSAS CITY, MISSOURI, A PARTNERSHIP COMPOSED OF CHARLIE W. LOVELACE, OF KANSAS CITY, MISSOURI, AND SAID SMITH.

PIPE COUPLING.

Application filed July 9, 1926. Serial No. 121,355.

This invention relates to pipe or tube couplings, and more especially to couplings for connecting coil members, and my object primarily is to provide a dependable connection susceptible of quick and easy removal to facilitate cleaning or replacement of coil members. A further object is to provide a coupling having no rolled or threaded joints in contact with fluid circulating through the coils, and which may be applied in or removed from operative position by means of an ordinary wrench. Another object is the provision of a coupling which can be placed in or removed from operative position without having to crimp or cut the coil members, and which can be readily applied or removed by one man. A still further object is to provide a coupling possessing the advantageous features above-mentioned and having fewer joints to leak than the conventional types of couplings employed in systems operating under high pressures or temperatures, and hence having a high factor of safety. Other advantages in point of economy are that but little machining of the coupling or fitting is necessary, and unskilled labor can be utilized in the erection, repair and cleaning work occasionally necessary in systems operating under high pressures or temperatures.

With these general objects in view, the invention consists in certain novel and useful features of construction and combinations of parts as hereinafter described and claimed; and in order that it may be fully understood, reference is to be had to the accompanying drawing, in which:—

Figure 1 is a view partly in elevation and partly in central section of a part of a still in which a pair of tubes are secured in co-operative relationship by a coupling embodying the invention, the section being taken on the line I—I of Figure 2.

Figure 2 is an end view of the construction shown by Figure 1.

Figure 3 is a section on the line III—III of Figure 1.

Figure 4 is an elevational view of a part of one of the tubes and a sectional locking ring forming a part of the coupling.

Figure 5 is a detail view of the two sections of the locking ring.

Figure 6 is a sectional view of a modified type of coupling as applied to widely spaced parallel tubes, only one of the tubes and one end of the coupling being shown.

Figure 7 is a section taken on the line VII—VII of Figure 6.

Referring first to Figures 1 to 5 inclusive, 1 indicates a pair of parallel tubes forming members of a circulating coil, and 3 is a substantially U-shaped coupling member for the adjacent ends of said types, so that fluid may circulate from one of the tubes through the coupling member to the other tube. Each tube is provided near each extremity with an annular groove 4 for the reception of a ring composed of two or more members 5, this arrangement guarding against longitudinal slippage of the tube through the ring.

A follower 6 spans the space between the tubes 1 when they are relatively close together, and is provided with openings 7 for fitting slidingly on the respective tubes, said openings being enlarged at their outer ends to fit over the locking ring members 5 and form a shoulder 8 to bear outwardly against said locking ring, which thus serve to limit outward sliding movement of the follower on the tubes. The follower is provided at opposite sides with perforated lugs or ears 9 longitudinally alined with perforated lugs 10 at opposite sides of the coupling member 3.

Bolts 11 extend through the respectively alined lugs 9 and 10, their heads bearing against lugs 9, and nuts 12 engage the outer or threaded ends of the bolts and bear against lugs 10 through the interposed washers 13, as shown most clearly by Figure 1. At the extremity of the coupling members are formed sockets 14 receiving the adjacent ends of the tubes, and to make the joint between each tube and the coupling member liquid tight, a soft metal or equivalent gasket 15 is fitted in each socket, the base of the socket having a V-shaped rib 16 and the tube a corresponding groove 17 so that when the coupling member is clamped against the ends of the tubes, the gaskets shall be kinked or bent, as shown clearly by Figure 1.

Where tubes to be connected are spaced widely apart relatively, it is desirable to provide an independent follower for each tube instead of a follower extending across and engaging two tubes, and to connect each follower or collar with the corresponding end of the coupling member by a plurality of short bolts located at opposite sides of the respective tubes and engaging ends of the coupling member, as this construction provides a more substantial connection between the tubes and coupling member than a pair of bolts disposed intermediate the length of the coupling member and between the tubes if the latter are widely spaced as is true in some types of coils.

Referring now particularly to Figures 6 and 7, 18 indicates a tube and 19 a follower mounted on said tube, a similar follower, not shown, being mounted on an adjacent tube, also omitted. The coupling member 20 in this instance is provided with a marginal flange 21 at each end, one end only appearing, and a pair of bolts 22 extend through each follower 19 and the opposing flange 21 of the coupling member. In other respects, the connection is identical with the construction shown by Figures 1 to 5 inclusive, that is to say, the tubes fit in sockets in the coupling members, kinked gaskets are interposed between the ends of the tubes and the bottoms of the sockets, and sectional locking rings are fitted in grooves in the tubes and against outwardly facing shoulders formed on the followers, the kinking of the gaskets being produced by the force exerted by the nuts 23 engaged with the threaded ends of the bolts.

In applying the coupling operatively, the follower or followers are first slipped upon the ends of the tubes to be connected. The sectional locking rings are then applied to the tubes, and the followers slipped outwardly on the latter and said locking rings. The coupling member is then applied to the ends of the tubes, and bolts placed in position to receive the washers and nuts. A wrench is then applied to the nuts to screw them home and thus clamp the coupling member firmly in place with a liquid tight joint, it being understood of course that the gaskets are placed in the sockets prior to the application of the coupling member to the tubes.

A single operator can apply the couplings rapidly and efficiently, and can as easily remove them should the necessity therefor arise.

From the above description, it will be apparent that I have produced a pipe or tube coupling which embodies the features of advantage set forth as desirable in the statement of the objects of the invention, and which is susceptible of modifications in minor particulars without departing from the principle of construction and mode of operation involved.

I claim:

The combination in a return bend pipe connection of a pair of tubes each having an external annular groove spaced from the end of the tube, of sectional locking rings fitted in said grooves and projected therefrom to constitute external shoulders, a follower sliding on the tubes and provided with internal shoulders bearing against the external shoulders of the tubes, a return U-bend coupling having socketed abutment relation with the ends of said tubes and being formed integrally at its opposite sides and on the outer portion of the bend with a pair of bolt receiving lugs, and bolts engaging at their opposite ends said lugs and the follower for clamping the members together.

In witness whereof I hereunto affix my signature.

ARTHUR J. SMITH.